United States Patent [19]

Di Tullio

[11] Patent Number: 5,314,580
[45] Date of Patent: May 24, 1994

[54] PROCESS FOR THE REMOVAL OF INK, RESIN, AND ADHESIVE RESIDUES FROM PAPER, TEXTILE FABRICS AND SOLID SURFACES

[75] Inventor: Venanzio Di Tullio, Perth, Canada

[73] Assignee: Mauvin Material & Chemical Processing Limited, Perth, Canada

[21] Appl. No.: 910,411

[22] Filed: Jul. 8, 1992

[51] Int. Cl.⁵ .............................................. D21C 5/02
[52] U.S. Cl. ........................................ 162/5; 162/189
[58] Field of Search .................................. 162/5, 189

[56] References Cited

U.S. PATENT DOCUMENTS

| | | |
|---|---|---|
| 1,990,376 | 2/1935 | Hass ................................. 162/5 |
| 2,350,693 | 12/1945 | Dean ................................ 162/5 |
| 2,703,754 | 3/1955 | Myers ............................... 162/5 |
| 3,051,609 | 8/1962 | Grossmann ...................... 162/5 |
| 3,051,610 | 8/1962 | Grossmann ...................... 162/5 |
| 3,056,713 | 10/1962 | Gartner ............................ 162/5 |
| 3,058,871 | 10/1962 | Davis et al. . |
| 3,069,307 | 12/1962 | Boaz et al. . |
| 3,069,308 | 12/1962 | Lissant ............................. 162/5 |
| 3,098,784 | 7/1963 | Gorman ........................... 162/5 |
| 3,226,343 | 12/1965 | Rhodes ............................ 162/5 |
| 3,392,083 | 7/1968 | Illingworth . |
| 3,446,696 | 5/1969 | Illingworth . |
| 3,635,789 | 1/1972 | Greer, Jr. ......................... 162/5 |
| 3,764,460 | 10/1973 | Miyamoto ........................ 162/5 |
| 3,808,089 | 4/1974 | Von Koeppen .................. 162/5 |
| 3,822,178 | 7/1974 | Von Koeppen .................. 162/5 |
| 3,910,813 | 10/1975 | Westcott et al. . |
| 3,932,206 | 1/1976 | Illingworth et al. . |
| 3,933,578 | 1/1976 | Kasugai ............................ 162/5 |
| 3,963,560 | 6/1976 | Mestetsky ........................ 162/5 |
| 3,986,922 | 10/1976 | Parker et al. . |
| 4,006,006 | 2/1977 | Penque ............................. 162/5 |
| 4,017,642 | 4/1977 | Orth et al. . |
| 4,037,466 | 7/1977 | Alburger . |
| 4,076,578 | 2/1978 | Puddington ...................... 162/5 |
| 4,145,226 | 3/1979 | Neuhaus ........................... 162/5 |
| 4,162,186 | 7/1979 | Wood et al. . |
| 4,215,447 | 8/1980 | Gartland et al. . |
| 4,229,493 | 10/1980 | Bendiner et al. . |
| 4,231,841 | 11/1980 | Calmanti et al. . |
| 4,326,912 | 4/1982 | Mollett ............................. 162/5 |
| 4,337,121 | 6/1982 | English . |
| 4,426,254 | 1/1984 | Wood et al. . |
| 4,483,741 | 11/1984 | Mahoney et al. ................ 162/5 |
| 4,496,426 | 1/1985 | Baumeister et al. . |
| 4,505,776 | 3/1985 | Murray . |
| 4,561,933 | 12/1985 | Wood et al. . |
| 4,586,982 | 5/1986 | Poppel et al. . |
| 4,618,400 | 10/1986 | Wood et al. . |
| 4,632,730 | 12/1986 | Ulabay et al. . |
| 4,666,558 | 5/1987 | Wood et al. . |
| 4,680,088 | 7/1987 | Bastanzuri . |
| 4,710,267 | 12/1987 | Elsby et al. ...................... 162/5 |
| 4,737,582 | 4/1988 | Goldman et al. . |
| 4,788,043 | 11/1988 | Kagiyama et al. . |
| 4,810,328 | 3/1989 | Freis et al. . |
| 4,820,379 | 4/1989 | Darlington . |
| 4,827,028 | 5/1989 | Seardera et al. . |
| 4,872,953 | 10/1989 | Smith ............................... 162/5 |
| 4,875,974 | 10/1989 | Rich . |
| 4,886,575 | 12/1989 | Moreland . |
| 4,935,096 | 6/1990 | Gallagher et al. . |
| 4,956,048 | 9/1990 | Hise . |
| 4,959,123 | 9/1990 | Lehmann et al. . |
| 4,964,949 | 10/1990 | Hamaguchi et al. . |
| 4,971,656 | 11/1990 | Lehmann et al. . |

FOREIGN PATENT DOCUMENTS

| | | |
|---|---|---|
| 1150010 | 7/1983 | Canada . |
| 174825 | 3/1986 | European Pat. Off. . |
| 394775 | 10/1990 | European Pat. Off. . |
| 2158836 | 11/1985 | United Kingdom . |

OTHER PUBLICATIONS

Aldrich, Lyman "A new look at deinking with solvents" TAPPI, vol. 60 No. 8 (Aug. 1977) pp. 114–116.

Primary Examiner—W. Gary Jones
Assistant Examiner—Brenda Lamb
Attorney, Agent, or Firm—Dressler, Goldsmith, Shore & Milnamow, Ltd.

[57] ABSTRACT

A process for the preparation and use of a cleaning solution with both foaming and non foaming properties which can be used to de ink paper or clean surfaces which have been soiled either by the pulping of virgin or secondary recycled fiber or natural usage.

9 Claims, 2 Drawing Sheets

PROCESS FOR THE REMOVAL OF INK, RESIN, AND ADHESIVE RESIDUES FROM PAPER, TEXTILE FABRICS AND SOLID SURFACES

BACKGROUND OF THE INVENTION

1. Field of the Invention

The invention relates to a process for the release of stickies (acrylic contact adhesives and polyester hotmelts), ink (absorbing, oxidizing, evaporating, radiation cured and xerographic), coating binders (latex), dyes, pigments and natural organic deposits (pitch and asphalt) from surfaces which have been manufactured as a product (e.g. printed articles) or are being recycled for reprocessing purposes.

This invention is also directed to the preparation of high brightness pulps and the reduction of chromophoric compounds from pre and post consumer products such as kraft paper etc.

2. Description of the Prior Art

It is known that articles can be de-inked by at least one of three ways.

Dry Process for De-inking Substrates

It is known the use of minimal amount of water i.e. lipophilic solvents, can be used to de-ink a substrate (1-5).

1 Dreis A.G. Paper Trade J. 143 (43) 28 (1959).
2 Samuelson G.J., Lissant K.J. U.S. Pat. No. 3,072,521 (1963).
3 Bocci A. U.S. Pat. No. 3,253,976 (1966).
4 E.F. Davis, R. Luce U.S. Pat. No. 3,058,871.

According to Gross, in the case of post consumer paper products, ". . . pulp approaching virgin market pulp in cleanliness and brightness" can be attained.
5 Gross R.B.—TAPPI, Secondary Fiber Conference, Boston, Sep. 1974.

The advantages of this system are: a) the ease with which varnish, ink, pigments, dyes, and adhesives can be separated from the substrate, b) the high yield of fiber in the case of paper, c) the minimal (dry) low volume of rejects generated, d) the lack of need for further treatment of the substrate or fiber prior to stock preparation for the paper machine, e) the relative cleanliness of future surfaces with which the processed fiber comes into contact and f) the simplicity, low cost and amount of equipment required. In the case of paper machine components and processed pulp, this process, also has inherent disadvantages among which some are a) the high cost of the solvents, b) the need for complete solvent recovery (economic, health and safety regulations), and c) the need for paper segregation since type of solvent impacts on the brightness of the resultant pulp.

Flotation De-inking of Pulp

In this process, it is desirable to effectively remove the broadest range of ink particle sizes while keeping the fiber loss at an acceptable level.

The flotation de-inking process is governed basically by the incoming stock and the chemistry of the solvent mixture. In general bubbles with a diameter of 0.3 mm or larger having sufficient buoyancy to push through the fiber slurry are used. Particles (10-100 microns) colliding with and adhering to the bubbles are carried to the surface where the particle-bubble complex is removed. In this case, foam generated by the air bubbles not only must be stable enough to carry ink and debris rejects to the weir but must be capable of breaking down after entering the weir. Excess foam will contribute to stock loss while unstable foam reduces brightness. Calcium ions, a component of coated magazines are a major cause of stock loss.

Washing De-inking of Pulp

This process involves the removal of particulate materials whose size are 5-15 microns in diameter. The efficiency of particulate removal outside of this range drops dramatically.

The process, by nature, is carried out as the stock is thickened to 10% from less than 1% if a vacuum drum washer or stock thickener is used and to 40% when a screw press is employed. Loss of ash during washing is an advantage if the recovered pulp is used in tissue production. The main disadvantages of this system are: a) the need to use low consistencies thus requiring large amounts of space, b) the use of screens which means good fibers tend to be lost, c) high water consumption, and d) loss of filler for other than tissue applications.

To avoid the difficulties outlined in the prior art methods, therefore, the present invention seeks to provide a process for the separation of contrary contaminants such as stickies, ink, binders, pitch and dyes from post consumer paper and paper machine clothing which has come in contact with pulp being recycled.

The present invention further seeks to provide a process by which contaminants can be removed from paper machine clothing without interrupting production on the paper machine.

The present invention also seeks to provide a process by which a small capacity, low energy consuming, closed solvent looped recycling unit shall become economically viable.

Such units shall therefore become viable in areas of lower population density since the fiber quality of the recycled materials shall be known at the generating end of pulp preparation. This does not detract from the process's capability in areas of high population density. It only means critical needs requirements such as space, energy, liquid volumes, capacity, and volume of raw materials can be attained at lower levels and that costs incurred from the above are dramatically lowered. It is a particular aim of the present invention to show that the use of the pulp generated 1) eliminates the cost of transportation of contrary contaminants found in post consumer paper, and 2) lowers the level of contaminating contraries which can deposit on the advance vacuum box top, system surface, machine clothing, press rolls, Uhle box tops and the like.

The present invention seeks to raise the yield of pulp when compared to present day methods.

The present invention also seeks to use the solvent solution to remove contaminants deposited on paper machine surfaces without interrupting production and contaminating the water system thereof. Such deposits occur when prior art flotation and washing de-inking techniques are used.

SUMMARY OF THE INVENTION

The present invention provides a process whereby surface coated contaminants such as, contrary ink deposits can be removed from paper machine components with no loss to production and little contamination of the white water while maintaining a steady state of quality production throughout the life of the machine drainage elements. The present invention can thus be considered to be an improvement over the art known process for the cleaning of paper machine clothing.

The invention can be more fully appreciated when the cleaning solution is used to extract the contraries at an earlier stage of the pulp/paper production.

The cleaning solution when used as the liquid component of a secondary fiber pulp slurry will dissolve or gelate chromophoric dyes, varnishes, adhesives, binders, and other natural organic deposits.

Removal of these contrary components alleviates the need to unplug drainage dewatering elements which become blocked during normal paper production. The cleaning solutions used are aqueous mixtures of lipophilic agents which exhibit a lower critical solution temperature. Such solutions have the ability to separate into biphasic mixtures simply by raising the temperature of the solution or by raising its inorganic salt concentration to, for example, 1-2% by weight.

The ability to simultaneously raise the li-pophilic and hydrophilic properties of the solution by causing a biphase to form, i.e. by simple upper adjustment of the salt concentration or temperature greatly expands the cleaning capabilities of the solution and solubilities of the constituent contraries.

The present invention provides a method of decontaminating a solid surface with a recyclable liquid composition comprising:

| | |
|---|---|
| Alkyl phenol polyethoxylate | 0-10% |
| Sodium silicate | 1-2.5% |
| Sodium hydroxide | up to 2.5% |
| Alkyl or dialkyl glycol or diglycol ether and/or propyl glycol ether | 10-40% |
| Alkyl acetate | 0-10% |
| Hydrogen peroxide or sodium or calcium hypochlorite | 0-3% |
| Triethylamine and/or diethylmethylamine and/or dimethylpyridine and/or methyl pyridine and/or methyl piperidine | 0-10% |
| Water | to 100% | having a lower critical solution temperature between about 0° C. and about 100° C. which method comprises treating said solid surface with a decontaminating effective amount of said liquid composition. Percentages and proportions are by weight unless otherwise specified.

The present invention further provides a method of cleaning a fabric or paper making screen which comprises:

spraying at between 0 and about 300 psi a liquid composition

| | |
|---|---|
| Alkyl phenol polyethoxylate | 0-10% |
| Sodium silicate | 1-2.5% |
| Sodium hydroxide | up to 2.5% |
| Alkyl or dialkyl glycol or diglycol ether and/or propyl glycol ether | 10-40% |
| Alkyl acetate | 0-10% |
| Hydrogen peroxide or sodium or calcium hypochlorite | 0-3% |
| Triethylamine and/or diethylmethylamine and/or dimethylpyridine and/or methyl pyridine and/or methyl piperidine | 0-10% |
| Water | to 100% | having a lower critical solution temperature between about 0° C. and about 100° C. onto said fabric or paper making screen to loosen or remove any dirt residing thereon.

Among preferred features of the invention are:

(a) spraying the detergent composition through a plurality of orifices, preferably two to four sets of orifices, each set of such orifices being spaced about 2.5 cm from an adjacent set of orifices;

(b) the fabric or paper making screen is preferably moving, especially against the flow of the spray;

(c) using a water spray after the detergent spray to remove loosened dirt.

The invention also provides a method of de-inking or cleaning paper and of recycling a liquid composition comprising:

| | |
|---|---|
| Alkyl phenol polyethoxylate | 0-10% |
| Sodium silicate | 1-2.5% |
| Sodium hydroxide | up to 2.5% |
| Alkyl or dialkyl glycol or diglycol ether and/or propyl glycol ether | 10-40% |
| Alkyl acetate | 0-10% |
| Hydrogen peroxide or sodium or calcium hypochlorite | 0-3% |
| Triethylamine and/or diethylmethylamine and/or dimethylpyridine and/or methyl pyridine and/or methyl piperidine | 0-10% |
| Water | to 100% | having a lower critical solution temperature between 0° C. and 100° C. which method comprises:

a) treating a pulp slurry of the paper with the liquid composition to remove ink from the paper slurry and the liquid composition;

b) separating cleaned paper slurry from the liquid composition;

c) heating the liquid composition resulting from step (a) to above its lower critical solution temperature, or adding small amounts of a salt or a hydrophilic absorbent to the liquid composition resulting from step (a) to give an aqueous phase and an organic phase;

d) separating and purifying the aqueous phase and the organic phase for reuse.

Among preferred features are:

(d) employing a composition comprising (by weight):
14% butyl cellosolve (butoxy ethanol)
7% nonyl phenol polyethoxylate
2% sodium hydroxide
2% sodium silicate
balance water The amount of butyl cellosolve may range up to 40%, the amount of nonyl phenol polyethoxylate may range down to 0% while the water may range down to 50% in a composition of this preferred type;

(e) running the pulp slurry in a countercurrent to the detergent composition;

(f) using a composition having a lower critical solution temperature between about 12° C. and 50° C.;

(g) removing ink carbon particles by using plastic process elements, for example mechanically removing ink carbon particles with styrene acrylonitrile elements which are subsequently brush cleaned of ink carbon particles;

(h) if the paper carries a thermally- or ultraviolet-polymerized ink then the ink can be dispersed as particles by ultrasonic means applied to the pulp slurry.

The present invention provides a process whereby fabrics on or from a paper machine can be cleaned of stickies, ink, adhesives, and such contrary debris.

The present invention further provides a process whereby cleaning can be effected during normal production without interruption of the manufacture of paper products.

Among preferred features are a method whereby (1) minimal change occurs in the furnish composition, (2) a larger range of paper types can be used, and (3) a higher yield is attained.

The present invention also provides a mechanism of reclaiming paper much closer to the generator of waste.

Among preferred features are a system which (1) is more energy efficient, (2) generates a more consistent quality level of the paper produced in a shorter cycle time period and (3) has a greater capacity to turn over waste paper.

Among advantages of the invention are the following:

1. Fabrics on or from a paper machine can be cleaned of stickies, ink, adhesives and such contrary debris;
2. Cleaning can be effected during normal production without interruption of the manufacture of paper products;
3. The cleaning agent can be collected for disposal with minimal change in the furnish composition;
4. De-inking of paper products can be effected in a minimal space and at low costs;
5. The process, by virtue of its nature, permits a greater range of paper types to be mixed during de-inking, i.e. reduces the need for sorting;
6. The process can be used to disperse thermally- or ultra-violet-polymerized inks;
7. The process reduces the need for high volumes of waste paper products;
8. The process has yield increases of the order of 10% thereby reducing the need for disposal of waste fiber;
9. The process reclaims waste fiber much closer to the generator of waste, thus eliminating the need for transportation of waste outthrows and non fibrous products;
10. The process is more energy efficient since most steps are performed at ambient temperatures;
11. The process reduces the potential for contaminating drainage elements on the paper machine thus reducing shut-down and wire cleaning time;
12. The process reduces the cleaning cycle of post consumer paper thus increasing machine capacity;
13. The process raises the quality of the product by reducing the number of holes, printing breaks, and sheet defects in recycled paper;
14. The process uses low cost chemicals.

DESCRIPTION OF THE DRAWINGS

The drawings which illustrate aspects and embodiments of the invention.

DESCRIPTION OF SPECIFIC EMBODIMENTS

Figure 1:
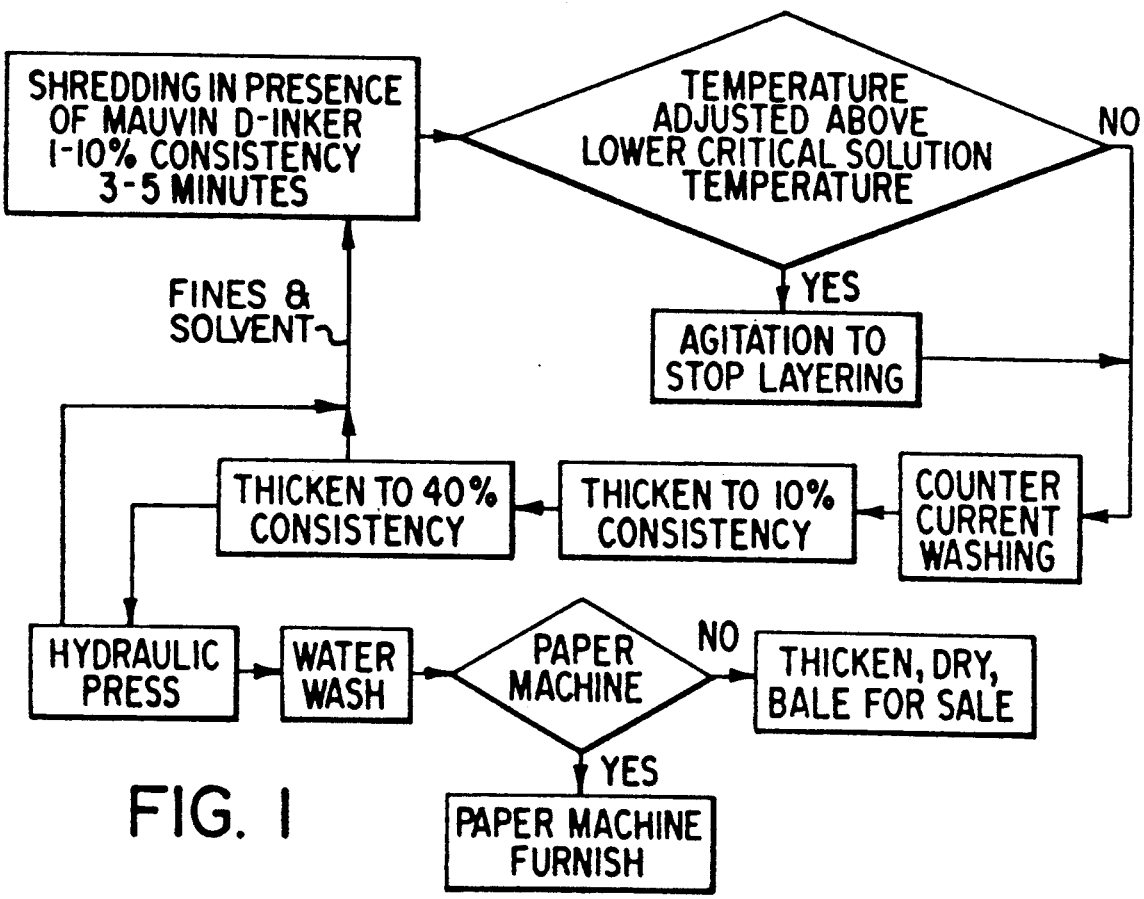
FIG. 1 is a schematic FIGURE of events in a particular embodiment directed to cleaning paper.

In a preferred embodiment of the process of the invention, a mixture of a lipophilic compound which exhibits a lower critical solution temperature, a surface active agent preferably nonionic, metal hydroxide and an inorganic wetting agent is used either as a cleaning agent for paper machine components or as a de-inking agent in paper, textiles and solid surfaces.

Another embodiment of the invention relates to the use of solutions which have a lower critical temperature, i.e. three levels of lipophilicity can be incorporated into one solution by either changing the temperature or its concentration.

The composition employed must have an aqueous phase and an organic phase above a lower critical solution temperature, that is, show decreasing mutual solubility with an increase in temperature (e.g. as shown by triethylamine and water). Below the critical solution temperature the composition comprises one phase. Above it, it comprises two phases. The composition is used for cleaning or de-inking preferably below the lower critical temperature and then heated to above the lower critical temperature to produce two phases which are then separated and treated before reuse. The critical temperature is between about 0° C. and about 100° C. preferably below 50° C. to avoid excessive heating requirements, more preferably below about 40° C.

The composition can be used above the lower critical temperature in cases where a biphase system, one rich in organic and the other rich in hydrophilic components is needed.

Compositions of the invention include the following:

| Composition A | |
|---|---|
| Alkyl phenol polyethoxylate | 0–10% |
| Sodium silicate | 1–2.5% |
| Sodium hydroxide | up to 2.5% |
| Alkyl or dialkyl glycol or diglycol ether and/or propyl glycol ether | 10–40% |
| Alkyl acetate | 0–10% |
| Hydrogen peroxide or sodium or calcium hypochlorite | 0–3% |
| Triethylamine and/or diethylmethylamine and/or dimethylpyridine and/or methyl pyridine and/or methyl piperidine | 0–10% |
| Water | to 100% |

Composition B is the same as composition A but does not have the alkyl phenol polyethoxylate. It is a subset of composition A of a type which does not foam.

A specific composition of interest is Mauvin D-inker*.

*Trade-mark 12

A 25% composition of Mauvin D-inker comprises:
14% Butoxyethanol
7% nonyl phenol polyethoxylate
2% sodium hydroxide
2% sodium silicate
balance water 1. Fabric cleaning on a Paper Machine while it is running In the process of the invention the administration of the cleaning solution at an elevated concentration, preferably 25–40% by weight in water causes ink debris to enter a gel state. Administration of the cleaning solution at elevated pressures, preferably greater than 300 psi can remove pigments, dyes, adhesives, pitch, binders, varnishes and other natural organic deposits. For purposes of economy, the gelled deposits can also be removed by high pressure water from fan or needle showers which are presently used on paper machines.

Directional flow of the jet is such that it is preferably but not necessarily in running attitude with the tortuous permeating flow paths of the fabric. The vectoral direction of * Trade-mark 12 jet flow is preferably opposite to the direction of fabric movement in order to take advantage of the cumulative sum of their velocities thus increasing the momentum of the mass of water as it impinges on the moveable contrary deposits (see FIG. 2).

Figure 2:
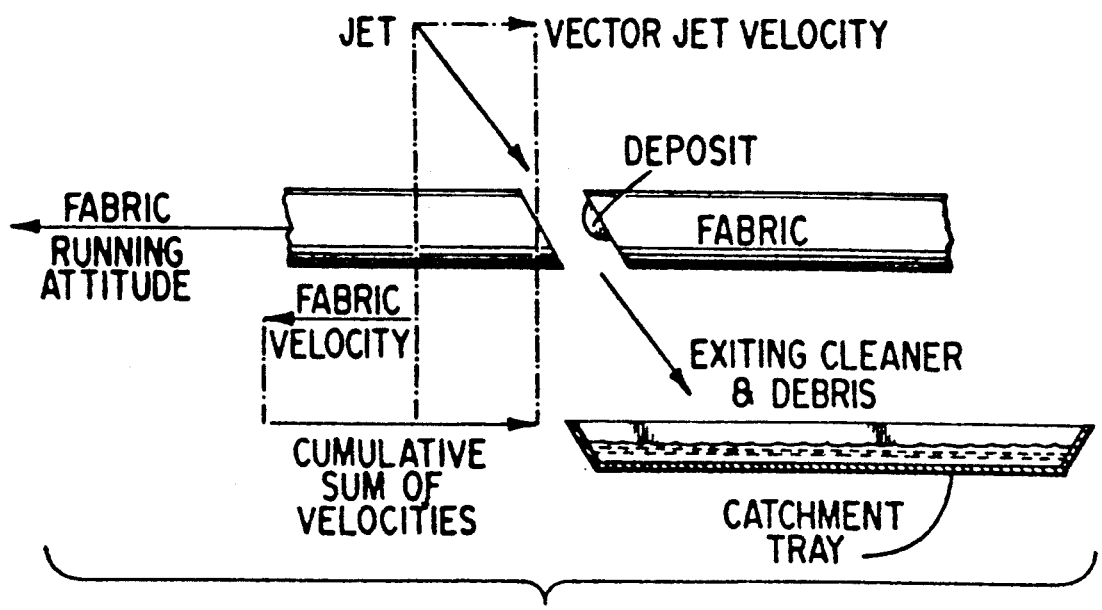
FIG. 2 is a diagram showing a preferred arrangement of a jet of the de-inking and cleaning composition with respect to a fabric belt used in paper making.

Use of high hydrostatic velocities in conjunction with directional choices of jet and flow paths is an important embodiment of the process (see FIG. 2).

It is known in the art that at high fabric velocities an impinging liquid will not wet the surface. Pressure is required to force the liquid to become a part of the fabric system else it rolls off just like water rolling off a red hot stove surface. Forcing the liquid into the fabric by means of a flooded nip roll does not attain the same effect as from a high pressure shower.

Figure 3:
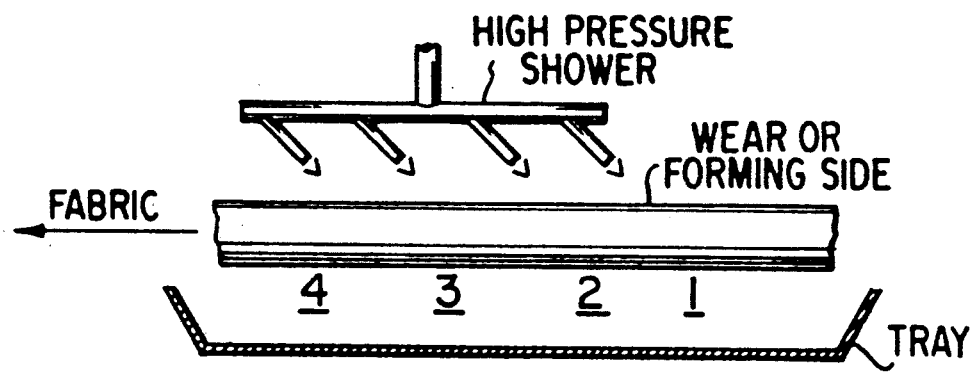
FIG. 3 is a diagram of a multi-headed needle shower and a fabric belt used in paper making.

High jet velocities must be used to ensure surface tensions of the impinging cleaning solution and the wet moving fabric are such that the two aqueous solutions can coalesce. We have found that high pressure is the most convenient way to ensure that the cleaning solution displaces the aqueous layer, wets the fabric surface and removes contaminant deposits. This is best accomplished by having a multi headed needle shower in sequence at least, 1 inch apart (shown diagrammatically in FIG. 3). The first stream displaces any water entrained in the fabric [1] and wets the surface; the second wets the surface and removes contaminants [2]; the third and subsequent showers ensure soil removal [3–4]. It is advantageous in this case to use high jet and fabric velocities.

Figure 4:
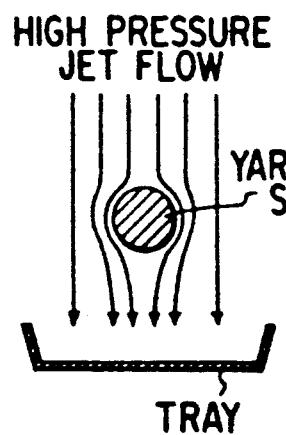
FIGS. 4 and 5 diagrammatically show an advantage of high pressure jet flow over low pressure jet flow.
Figure 5:
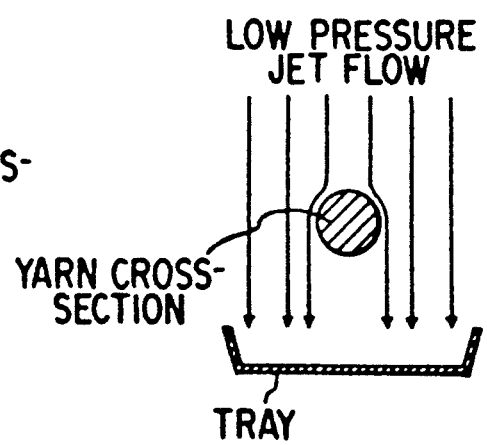

Thus, in accordance with the laws of hydrodynamics and water path flow both sides of the fabric can be cleaned (see FIGS. 4 and 5 for a diagrammatic representation of this). Characteristically, at high jet velocities and low fabric speeds the side on which the jet is located is preferably cleaned thus requiring a cleansing action from both sides of the fabric. The implication of the above is that the invention can be more advantageously applied on fast machines in comparison to slow or stationary ones. The economic advantage of the invention method is most apparent since cleaning of the fabric without interrupting production is desirable.

2 Cleaning of virgin and secondary fibers

This same solution which is proposed for cleaning or deinking paper machine elements and/or other solid surfaces such as textiles, can be used to de-ink paper, remove chromophoric natural products such as is found in kraft paper and cardboard, and reduce the concentration of fillers and coatings.

Now, referring more particularly to the present process, a 1 to 20% consistency of pulp slurry is formed with de-inking solution (Mauvin D-inker).

In treating waste paper, it is desirable to carry out the shredding or pulping with a high degree of agitation. Beating time varies with the particular system and apparatus. The beating zone may be comprised, for example, of an open but preferably for safety reasons, a covered tank. The tank may be equipped with or without baffles, reflection rings, etc., and may employ a rotating impeller, propeller, paddle, curved blade turbine etc. as part of a revolving shaft.

Other high agitation shredding equipment and beaters used to obtain comparable results are commercially available. Contact times of less than 5 minutes are sufficient. In cases where total removal of contraries is incomplete we found raising the temperature to form a biphasic mixture was of advantage. Upon completion of the beating action the mass is separated from the excess liquid and treated with a fresh charge of solvent. In order to avoid the second step, counter current extraction is suggested.

Passing the slurry through an ultrasonic dismembrator assists in dispersing ink as particles. This is especially useful if the ink is a thermally- or ultraviolet-polymerized ink. The slurry can be passed through the ultrasonic dismembrator as it runs from one stage to the next, e.g., after agitation.

In the embodiment shown in FIG. 1 in step 1 paper is shredded in the presence of Mauvin D-inker and a 1 to 10% consistency of paper slurry is formed. This takes 3 to 5 minutes. The temperature is then adjusted to be above the lower critical solution temperature so that the liquid divides into an organic phase and an aqueous phase. If contraries are incompletely removed then the slurry is agitated in step 2 to stop layering. After this in step 3 the pulp slurry is subjected to countercurrent washing, in step 4 the pulp thickened to 40% consistency, in step 5 thickened to 40% consistency, subjected to a hydraulic press in step 6, water washed in step 7 and then treated in the usual way on a paper machine, with or without furnish and in step 8 thickened, dried and baled for sale.

The Mauvin D-inker solvent is one which is capable of dissolving certain organic compounds while gelling others. The aqueous phase has the capability to dissolve water soluble compounds.

The explanation of the utility of the compositions, which explanation should not be taken as limiting, appears to be as follows.

The presence of sodium hydroxide and sodium silicate can neutralize acids, make organic salts which are calcium based more soluble by exchanging the calcium ion for sodium. Generally sodium silicate increases the wetting power of the solution. The sodium silicate also acts as a stabilizing agent for oxidizers which may be used to bleach the slurry. There is advantage to carrying out the cleaning in the presence of a nonionic surface active agent such as alkylphenolpolyethoxylate represented by the formula

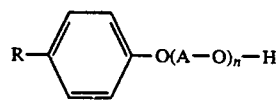

where R is a hydrocarbon group of 4-20 carbon atoms but preferably 8 or 9 carbon atoms;

A is an alkylene radical group comprising 2, 3 or 4 atoms; and n is the number of ethylene, propylene or butylene oxide units, preferably 4 to 12, particularly 9.

At low concentrations namely 0.1 to 1% the oxyalkylated phenol can be used to generate bubbles which are used in a flotation process. We have found little need for flotation since the chemistry of the slurry is such that particulate carbon is freely found in the aqueous layer. It was also found that particulate carbon had an affinity for plastic paddles which could be mechanically removed for cleaning. Thus submersion of a plastic tool to attract carbon particles followed by systematic removal (of the plastic) from the slurry in order to be brushed clean, can be used as a technique for carbon removal in the invention.

A solvent which has a lower critical solution temperature (LCST) (against water) of 0° C. to 100° C., preferably between 12° and 50° C., and having the ability to dissolve organic compounds is an essential constituent of the mixture. Some examples of such solvents are found in the Table below. The numbers in brackets are the lower critical solution temperatures. A range is given when a mixture of isomers is involved.

Dimethyl pyridine, (−3 to 34° C.), 3-methyl pyridine (49° C.) Butoxy ethanol (49° C.), Isobutoxy ethanol (24° C.), Hexamethyleneimine (67° C.), Methyl diethylamine (49° C.), Triethylamine (12°-18° C.), 2 and 3 Methyl piperidine (79° and 59° C.) 1, 2-propylene glycol-1-propylether (34° C.) and 1, 2-propylglycol-2-propylether (43° C.).

(A.W. Francis critical solution Temperatures, Advances in Chemistry Series #31 1961: American Chemical Society.) -(Note: Dimethyl pyridine is made up of three isomers. Depending upon the mixture used the LCST can range from −3 TO +34° C. Applicant's range of 0 to 100° C. fits the water component.)

For purposes of simplicity and example we used Butoxy ethanol as the LCST solvent.

The reason for using a LCST solvent is in order to take advantage of its capability to selectively change the solubilities of the solution by either increasing salt concentration or temperature. A further reason is to partition the extracted materials between the two layers formed thus using this phenomenon for partial isolation of the contrary materials and for purification of the solvent. Salt concentration and/or temperature can be used to temporarily generate a two phase system in order to solubilize specific contrary compounds. Upon isolation of contaminated solvent, the two phase system can be reverted to one phase at will.

Under normal conditions the pulped printed paper, is extracted using an LCST solvent. The solvent is next separated from the paper, and the solution turned into a two phase system. Water is azeotroped from the upper organic phase and the solvent from the lower aqueous phase. The organic phase normally carrying the extracts (usually colored) has a concentration of about 60:40 Butoxy-ethanol:water while the aqueous phase is 10:90 respectively. Suffice it to say other methods of solvent purification including selective absorption on silica or alumina and carbon black as well as distillation are well known to the art. It is not within the scope of the present invention to describe the various methods of purification.

A further advantage of the invention is that bleaching by a 1-5% concentration of hypochlorite or preferably by a 3-6% concentration of hydrogen peroxide is possible by introducing the bleaching agent into the de-inking solution with no known detrimental effects to its cleaning efficacy.

EXAMPLE

The following example was carried out by pulping 15 grams of waste inked paper in 400 mls of 25% Mauvin D-inker by means of Osterizer Blender (one minute). The pulp was gravity drained on an 84×76 mesh forming fabric. Further excess liquid was removed by means of a metallic press filter which had 2 mm holes. The press filter (a ricer) was of the type used to mash boiled potatoes The pulp consistency was in the 30-40% range depending on the pressure used.

The pulp was further washed by means of a second charge (400 mls) of 25% Mauvin D-inker. A light green to pink to grey pulp was obtained depending on the color source of the paper being recycled. The pulp residue was further rinsed twice with water (800 mls) and then bleached (15 minutes dwell time) by either 50 mls of 6.1% sodium hypochlorite or 3% hydrogen peroxide. When hydrogen peroxide was used, the pH was adjusted to 8.9 by adding solid sodium bicarbonate to the solution. Heating the solution to 50° C. lowered the required bleaching time. The water rinsed furnish (1% consistency) was filtered through a Buchner funnel to form a sheet. Brightness of the sheet (Elrephro Brightness) was consistently 70-80 depending on the source of the waste paper. Yields were in the 82-92% range depending on the source of paper and fines content. Yields of greater than 90% were obtained when kraft or photographic paper was de-inked but in the lower eighties when 100% old magazines was used. Although newsprint, fine paper, kraft and photographic paper have been used to illustrate the process, any fibrous material can be used in the process of the present invention. Some examples are: letterpress, offset, flexographic, lithography, xerographic, gravure, ink jet, book stock, ledger stock, labels, cardboard etc. The solvents employed are recovered, purified and reused as described above.

What I claim as my invention is:

1. A method of de-inking or cleaning paper and of recycling a liquid composition comprising:

| | |
|---|---|
| Alkyl phenol polyethoxylate | 0-10% |
| Sodium silicate | 1-2.5% |
| Sodium hydroxide | up to 2.5% |
| Alkyl or dialkyl glycol or diglycol ether and/or propyl glycol ether | 10-40% |
| Alkyl acetate | 0-10% |
| Hydrogen peroxide or sodium or calcium hypochlorite | 0-3% |
| Triethylamine and/or diethylmethylamine and/or dimethylpyridine and/or methyl pyridine and/or methyl piperidine | 0-10% |
| Water | to 100% | having a lower critical solution temperature between 0° C. and 100° C. which method comprises:
 a) treating a pulp slurry of the paper with the liquid composition wherein a single phase to remove ink from the paper slurry and the liquid composition;
 b) separating cleaned paper slurry from the liquid composition;

c) heating the liquid composition resulting from step (a) to above its lower critical solution temperature to give an aqueous phase and an organic phase;

d) separating and purifying at least one of the aqueous phase and the organic phase for reuse.

2. A method according to claim 1 wherein said composition comprises:

14% Butoxyethanol
7% nonyl phenol polyethoxylate
2% sodium hydroxide
2% sodium silicate
balance water.

3. A method according to claim 1 wherein the pulp slurry runs in a countercurrent to the liquid composition.

4. A method according to claim 1 wherein the lower critical solution temperature of the composition is between about 12° C. and about 50° C.

5. A method according to claim 1 wherein said paper carries a thermally- or ultraviolet-polymerized ink and said ink is dispersed as particles by ultrasonic means applied to the pulp slurry.

6. A method according to claim 1 wherein the organic phase is purified for reuse.

7. A method according to claim 1 wherein said organic phase comprises a solvent, butoxyethanol, and water and is purified by azeotroping water:butoxyethanol from said organic phase and then distilling the remaining solvent from said organic phase for reuse.

8. A method according to claim 1 wherein said aqueous phase comprises water and butoxyethanol and butoxyethanol:water is azeotroped from said aqueous phase.

9. A method according to claim 1 wherein residual organic solvent in said separated cleaned paper slurry is removed by azeotropic distillation of said organic phase.

* * * * *